(12) United States Patent
Simerson et al.

(10) Patent No.: US 10,887,459 B1
(45) Date of Patent: Jan. 5, 2021

(54) IDENTIFYING A LIVE PERSON ON A PHONE CALL

(71) Applicant: MOTOROLA MOBILITY LLC, Chicago, IL (US)

(72) Inventors: Jarrett K. Simerson, Glenview, IL (US); Leo S. Woiceshyn, Chicago, IL (US); Karthik Mohan Kumar, Chicago, IL (US); Yi Wu, Chicago, IL (US); Thomas Y. Merrell, St Charles, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/514,930

(22) Filed: Jul. 17, 2019

(51) Int. Cl.
*H04M 3/436* (2006.01)
(52) U.S. Cl.
CPC ................................. *H04M 3/436* (2013.01)
(58) Field of Classification Search
CPC .. H04M 3/436; H04M 3/533; H04M 2201/40; H04M 3/5183; H04M 2203/4536; H04M 3/51; H04M 2201/60; H04M 2203/306; H04M 2201/39; H04M 2201/38; H04M 3/5322; H04M 3/5166
See application file for complete search history.

(56) References Cited

U.S. PATENT DOCUMENTS

| | | | |
|---|---|---|---|
| 8,953,754 B1* | 2/2015 | Simon ................... | H04M 3/385 379/88.04 |
| 2006/0056600 A1* | 3/2006 | Merrow .................. | G10L 25/87 379/88.02 |
| 2013/0204607 A1* | 8/2013 | Baker, IV ............... | G10L 17/00 704/8 |
| 2014/0334612 A1* | 11/2014 | Singer ................. | H04M 3/5183 379/88.01 |

* cited by examiner

*Primary Examiner* — Akelaw Teshale
(74) *Attorney, Agent, or Firm* — Yudell Isidore PLLC (57) ABSTRACT

A method, a communication device, and a computer program product for identifying a live phone call. The method includes receiving, at a first communication device, an activation of a verification mode for a phone call. The method includes receiving, from a second communication device on the phone call, first audio data associated with the phone call. The method further includes determining, via a processor of the first communication device, if the first audio data contains machine originated audio, and in response to determining that the first audio data does not contain machine originated audio, generating and outputting an alert that the phone call is live.

20 Claims, 6 Drawing Sheets

IDENTIFYING A LIVE PERSON ON A PHONE CALL

BACKGROUND

1. Technical Field

The present disclosure generally relates to two-way voice communication devices and in particular to a two-way voice communication device that identifies when a live person is present on a phone call.

2. Description of the Related Art

Mobile communication devices, such as cell phones, are widely used for voice communication and data transmission. Oftentimes, when a user initiates a call to a company or business, the user is placed on hold by an automated call handling process and has to wait for a period of time and listen for a representative to come on and begin a conversation. During the hold process, the user may be forced to listen to music or a recorded message that continuously repeats. The user may have to wait a significant number of minutes or longer for a real human person to respond to the user's phone call.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, a communication device, and a computer program product for identifying a real person on a phone call. The method includes receiving, at a first communication device, an activation of a verification mode for a phone call and receiving, from a second communication device on the phone call, first audio data associated with the phone call. The method further includes determining, via a processor of the first communication device, if the first audio data contains machine originated audio and in response to determining that the first audio data does not contain machine originated audio, generating and outputting an alert that the phone call is live.

According to the described embodiments, a phone call that is live is a phone call where an actual live human being is at the external communication device. Thus, the received audio is not machine originated audio, which is provided by a machine.

According to another embodiment, a communication device comprises a memory having stored thereon a communication module for enabling phone calls and an identification module for identifying if a phone call is live. The a communication device further includes a display, a speaker, a microphone, at least one radio and one or more processors communicatively coupled to the memory, the display, the speaker, the microphone and the at least one radio. The one or more processors executing program code of the communication module and the identification module, which enables the communication device to receive an activation of a verification mode for a phone call and to receive, from an external communication device on the phone call, first audio data associated with the phone call. The program code further enables the communication device to determine if the first audio data contains machine originated audio and in response to determining that the first audio data does not contain machine originated audio, generate and output an alert that the phone call is live.

According to an additional embodiment, a computer program product includes a computer readable storage device with program code stored thereon which, when executed by one or more processors of a first communication device having a display, a speaker, a microphone, at least one radio and a memory, enables the first communication device to complete the functionality of receiving an activation of a verification mode for a phone call and receiving, from a second communication device on the phone call, first audio data associated with the phone call. The computer program product further enables the first communication device to determine if the first audio data contains machine originated audio and in response to determining that the first audio data does not contain machine originated audio, generating and outputting an alert that the phone call is live.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within communication device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Figure 1A:
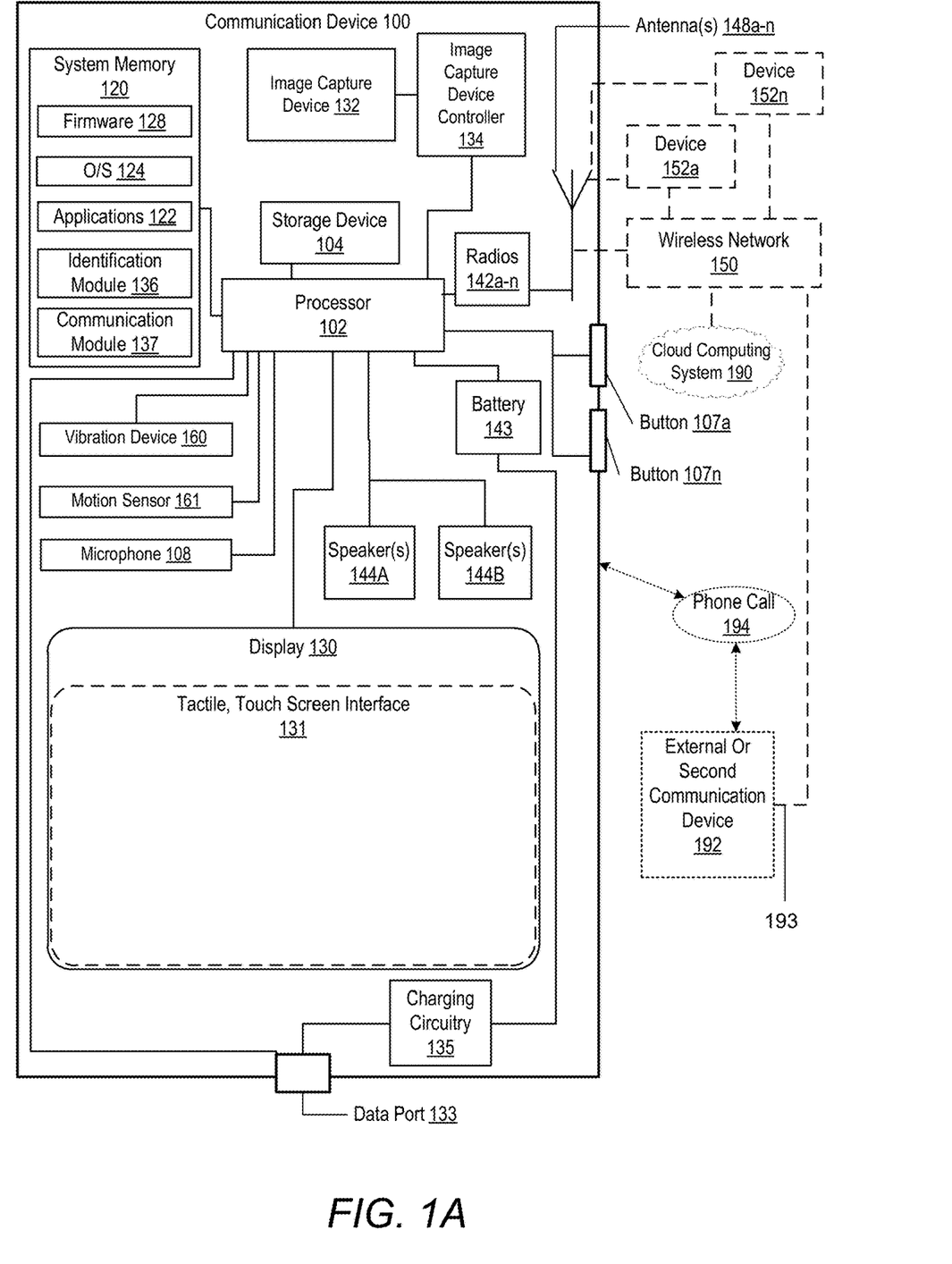
FIG. 1A depicts an example communication device configured as a mobile device within which various aspects of the disclosure can be implemented, according to one or more embodiments.

FIG. 1A depicts an example communication device 100 configured as a mobile device within which various aspects of the disclosure can be implemented, according to one or more embodiments. Examples of such communication devices include, but are not limited to, a notebook computer, a mobile phone, a digital camera, and a tablet computer, etc. Communication device 100 includes processor 102, which is communicatively coupled to storage device 104, system memory 120, display 130, and image capture device controller 134.

System memory 120 may be a combination of volatile and non-volatile memory, such as random access memory (RAM) and read-only memory (ROM). System memory 120 can store program code or similar data associated with firmware 128, an operating system 124, applications 122, identification module 136 and communication module 137. Identification module 136 includes program code that is executed by processor 102. Communication module 137 includes program code that is executed by processor 102 to enable phone calls between communication device 100 and another external communication device (192). Although depicted as being separate from applications 122, identification module 136 and communication module 137 may also be implemented as an application. Processor 102 loads and executes program code stored in system memory 120. Examples of program code that may be loaded and executed by processor 102 include program code associated with applications 122 and program code associated with identification module 136 and communication module 137.

Display 130 can be one of a wide variety of display screens or devices, such as a liquid crystal display (LCD) and an organic light emitting diode (OLED) display. In some embodiments, display 130 can be a touch screen device that can receive user tactile/touch input. Display 130 includes a tactile, touch screen interface 131 that allows a user to provide input to or control communication device 100 by touching the display screen.

In one embodiment, image capture device 132 is communicatively coupled to image capture device controller 134, which is communicatively coupled to processor 102. Image capture device 132 can capture images that are within the field of view of image capture device 132.

Communication device 100 can further include data port 133, charging circuitry 135, and battery 143. Communication device 100 further includes a microphone 108, one or more speakers 144A, 144B and one or more input buttons 107a-n. Speakers 144A can be speakers that are used next to the ear of a user and speakers 144B can be speakers that are used with an amplified signal away from the ear of the user. Input buttons 107a-n may provide controls for volume, power, and image capture device 132.

Communication device 100 further includes radios 142a-n, which are coupled to antennas 148a-n. In this implementation, radios 142a-n and antennas 148a-n allow communication device 100 to communicate wirelessly with other devices 152a-n via wireless network 150. In one embodiment, a cloud computing system 190 can communicate with communication device 100 via wireless network 150. According to one embodiment, identification module 136 can be stored within and be executed by cloud computing system 190 to verify or identify a real person at the terminating end of a phone call. Communication device 100 further includes vibration device 160 and motion sensor 161. Vibration device 160 can cause communication device 100 to vibrate.

Communication device 100 is in communication with an external, second communication device 192 that can be wired or wirelessly coupled to wireless network 150. In an embodiment, second communication device 192 can be a machine such as an automated phone system that uses non-human inter-active voice response (recorded audio or synthesized speech) to interact with users. In another embodiment, second communication device 192 can be a mobile or landline phone with a real human person listening and speaking (using) second communication device 192. Wireless network 150 can facilitate a phone call 194 between communication device 100 (operating as first communication device) and second communication device 192. Communication module 137 includes program code that is executed by processor 102 to enable phone calls between communication device 100 and second communication device 192. In one embodiment, second communication device 192 is at a terminating end 193 of the phone call with respect to communication device 100. In an alternate embodiment, second communication device 192 is at the originating end of the phone call, which is initiated by second communication device 192 with communication device 100.

Figure 1B:
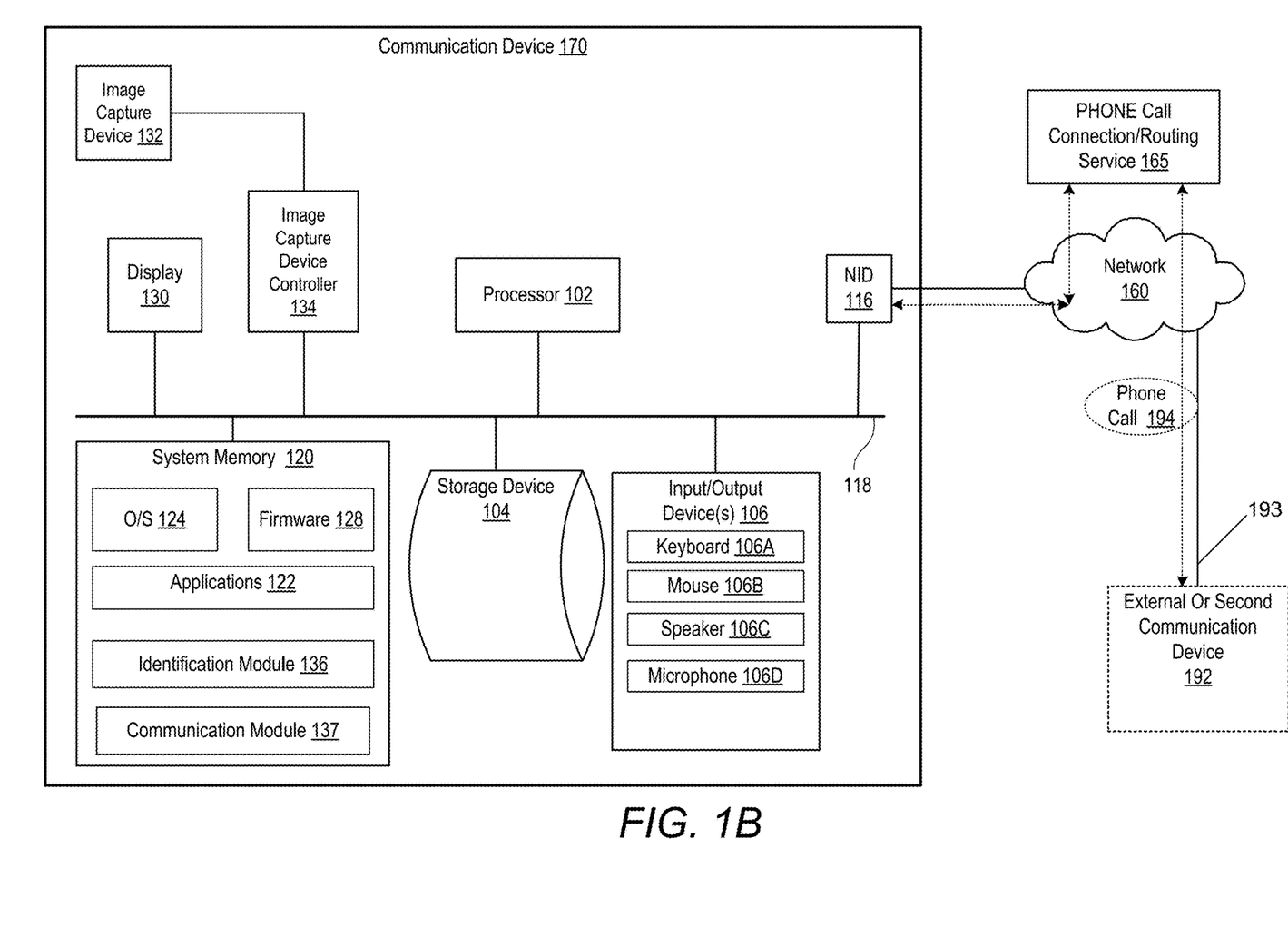
FIG. 1B depicts an example communication device configured as a computing device within which various aspects of the disclosure can be implemented, according to one or more embodiments.

FIG. 1B depicts an example communication device configured to be a computing device, according to one or more embodiments. Communication device 170 can be any computing device that is configured to and which supports two-way voice communication with a second communication device 192. Examples of such communication devices include, but are not limited to, a desktop computer, a monitor, a notebook computer, a server computer, etc. Communication device 170 includes a processor 102, storage device 104, system memory 120 and display 130. System bus 118 communicatively couples one or more of the processor 102, storage device 104, system memory 120 and display 130 with each other. Additionally, communication device 170 includes one or more input/output devices 106, network interface device (NID) 116, image capture device 132, and image capture device controller 134. System bus 118 communicatively couples one or more of the input/output device 106, NID 116, image capture device 132, and image capture device controller 134 to one or more components, such as processor 102 and system memory 120. Input/output devices 106 can be various devices such as a keyboard 106A, a mouse 106B, a speaker 106C, a microphone 106D, etc.

System memory 120 may be a combination of volatile and non-volatile memory, such as random access memory (RAM) and read-only memory (ROM). System memory 120 can store program code or similar data associated with firmware 128, an operating system 124, applications 122, identification module 136 and communication module 137. Identification module 136 and communication module 137 includes program code that is executed by processor 102. Although depicted as being separate from applications 122, identification module 136 and communication module 137 may also be implemented as an application. Processor 102 loads and executes program code stored in system memory 120. Examples of program code that may be loaded and executed by processor 102 include program code associated with applications 122 and program code associated with identification module 136 and communication module 137. Communication module 137 includes program code that is executed by processor 102 to enable phone calls between communication device 170 and another external communication device 192.

One or more networks, generally represented as network 160, can be in communication with communication device 170 via NID 116. Network 160 can be a variety of networks such as a local area network, a wide area network, a wireless network or the internet. A phone call connection/routing service 165 is in communication with network 160. Phone call connection/routing service 165 facilitates phone call communications between communication device 170 and second communication device 192. Phone calls between communication device 170 and second communication device 192 are routed through phone call connection/routing service 165 via network 160.

Communication device 170 is in communication with second communication device 192 that can be wired or wirelessly coupled to network 160. In an embodiment, second communication device 192 can be a machine such as an automated phone system that uses non-human inter-active voice response (recorded audio or synthetic speech) to interact with users. In another embodiment, second communication device 192 can be a mobile or landline phone with a real human person listening and speaking (using) second communication device 192. Communication device 170, network 160, phone call connection/routing service 165 and second communication device 192 can facilitate a phone call 194 between communication device 170 and second communication device 192.

Figure 2:
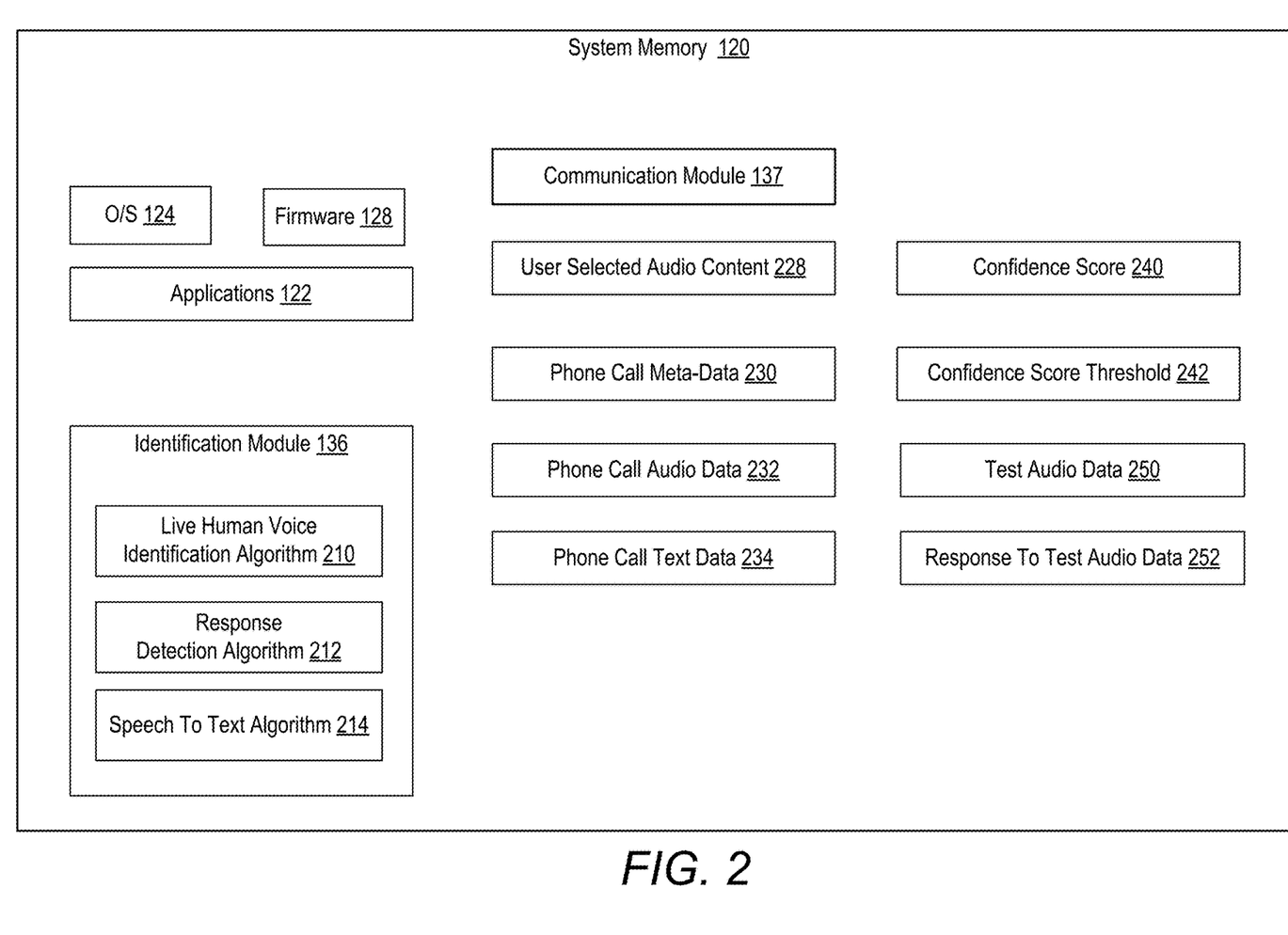
FIG. 2 is a block diagram of example contents of the system memory of a communication device, according to one or more embodiments.

In the description of each of the following figures, reference is also made to specific components illustrated within the preceding figure(s). With reference now to FIG. 2, one embodiment of example contents of system memory 120 of communication device 100 is shown. System memory 120 includes data, software, and/or firmware modules, including firmware 128, operating system 124, applications 122, identification module 136 and communication module 137. Identification module 136 enables the verification or identification of a live person on the terminating end of a phone call. In one embodiment, execution of identification module 136 by processor 102 enables/configures communication device 100 to perform the processes presented in the flowcharts of FIGS. 4A-4B, as will be described below.

Identification module 136 further includes human voice identification algorithm 210, response detection algorithm 212, and speech to text algorithm 214. Human voice identification algorithm 210 is a first verification or identification process that is used to analyze received audio data and determine if a live human voice is being received on the terminating end of the phone call or if the audio data contains machine originated audio from a device or machine. Machine originated audio can include recorded audio, synthetic speech, and computer-generated sounds. Response detection algorithm 212 is used to analyze the received audio data after test audio data has been sent or played. Response detection algorithm 212 is a second identification process that is used when the result of live human voice identification algorithm 210 has a low confidence level that a live person is on the phone call. Speech to text algorithm 214 converts incoming or received audio data from a phone call into text that can be shown on display 130.

Specifically, human voice identification algorithm 210 can include several steps or components. One component is a pre-processing stage which applies one or more signal processing algorithms to convert the phone call audio data 232 into more interpretable features such as Mel-scale filter banks. Mel-scale filter banks are a scale that helps to simulate the non-linear way a human ear works. The Mel-scale filter banks correspond to better resolution at low frequencies and lower resolution at high frequencies. Using the Mel-scale filter banks helps to capture the energy at each band and gives a rough approximation of the spectrum shape of the audio data. Mel-scale filter banks provide a more compact numerical representation of the audio data compared to analog audio samples, which makes learning and identifying patterns easier.

Another component of human voice identification algorithm 210 can include a neural network that is used to convert the audio signal to a probability value between 1 and 0, which represents the confidence that the speaker is a human not a machine or device. The neural network is a computational graph which can be interpreted as a function that performs a mapping between two spaces. The input space is a set of audio features which are extracted in the previous step for some specified amount of time, usually 20 milliseconds in practice, and the output space is simply a single number constrained to be between 0 and 1, representing a probability of being a live-human. The neural network is comprised of a set of parameters, which can be interpreted as coefficients which define the network's mapping function, which are learned 'training' the network on examples of audio containing both real-human and non-real-human speech. The specific type of neural network used contains both a convolutional portion and a recurrent portion. The convolution portion utilizes the spatial structure of the data to improve its pattern recognition capability and the recurrent portion utilizes a form of memory to learn sequences in the incoming audio data from each time step.

Response detection algorithm 212 is configured to identify if there is a response indicating a live human voice is present on the phone call in response to sent or played test audio data. For example, when test audio data is sent or played to a live human person on the phone call, the expected response is for the live person to pause their speech, for a short period of time, in order to listen to the test audio data. If the party on the call is not a live person, the received audio data such as music or a recorded message would not be interrupted for a short period of time. Response detection algorithm 212 can identify if the response pattern to the sent test audio data indicates that the party on the phone call is a live person and not a device or machine.

System memory 120 further includes user selected audio content 228, phone call meta-data 230, phone call audio data 232, and phone call text data 234. User selected audio content 228 is audio data that a user has pre-selected to be played on communication device 100 after the user has placed a phone call in real person identification mode. Phone call meta-data 230 is data about a mobile or cell phone call between one party and the user of communication device 100. Phone call meta-data 230 can include the phone number of the party on second communication device 192 of the phone call, caller id information, the length of the phone call, etc. Phone call audio data 232 is the audio data that is received by communication device 100 during a phone call from the other/remote communication device that is a party to the call. Phone call audio data 232 can include initial audio data for a phone call and subsequent audio data received at a later time after the phone call has started. At least a portion of the audio data received during a phone call can be stored as phone call audio data 232. For example, in one embodiment, the last 30 seconds of a phone call can be stored as phone call audio data 232. Phone call text data 234 is text that has been converted from phone call audio data 232 to text. Phone call text data 234 can be displayed on display 130 to a user to show what the other party on the phone call is saying.

System memory 120 further includes confidence score 240 and confidence score threshold 242. Confidence score 240 is a calculated value that indicates the probability that the other party on the phone call is a live person. A live person is an actual live human being who is speaking to provide live audio. The live person is not a machine, which provides machine originated audio, such as recorded audio or synthetic/synthesized speech or computer-generated sounds. In an embodiment, confidence score 240 can have values between "0" and "1" with a "0" value being not a live person and "1" being a live person. For example, confidence scores less than "0.75" can be identified as not being a live person and confidence scores greater than "0.75" can be identified as being a live person. Confidence score threshold 242 is a threshold value that is compared with confidence score 240 by processor 102 to determine if a live person is on the phone call. For example, if confidence score threshold 242 has a value of 0.75, any phone calls having associated audio data with a confidence score greater than 0.75 are identified as having a live person on the phone call. Phone calls having associated audio data with a confidence score less than 0.75 are identified as being non-live (i.e., machine originated). A non-human caller can have recorded audio or synthesized speech/voice.

System memory 120 also includes test audio data 250 and response to test audio data 252. Test audio data 250 is audio data that is sent (via uplink) or played to the other party on the phone call to test if the other party is a live person. In one embodiment, test audio data 250 is a short-delay echo of the phone call audio data 232 received from the other party. Test audio data 250 can be a captured first portion of the received audio data that is repackaged and transmitted back to the source (i.e., second communication device 192). Response to test audio data 252 is the audio data associated with the received response to the test audio data 250. In one embodiment, response to test audio data 252 can be a pause in the received audio data. In other embodiments, response to test audio data 252 can be various types of expected responses or can be no response. When the other party on the phone call has provided associated audio data that is assigned a confidence score less than 0.75, the other party is initially identified as not live or non-human, and test audio data 250 is sent to the other party as part of a secondary identification process. In an embodiment, when test audio data 250 is transmitted to the other party on the phone call, one expected response from a live person can be a pause in the other party's speech to listen to the test audio data. Response to test audio data 252 is analyzed using response detection algorithm 212 to determine if the phone call is live or if a live person is on the phone call.

Figure 3:
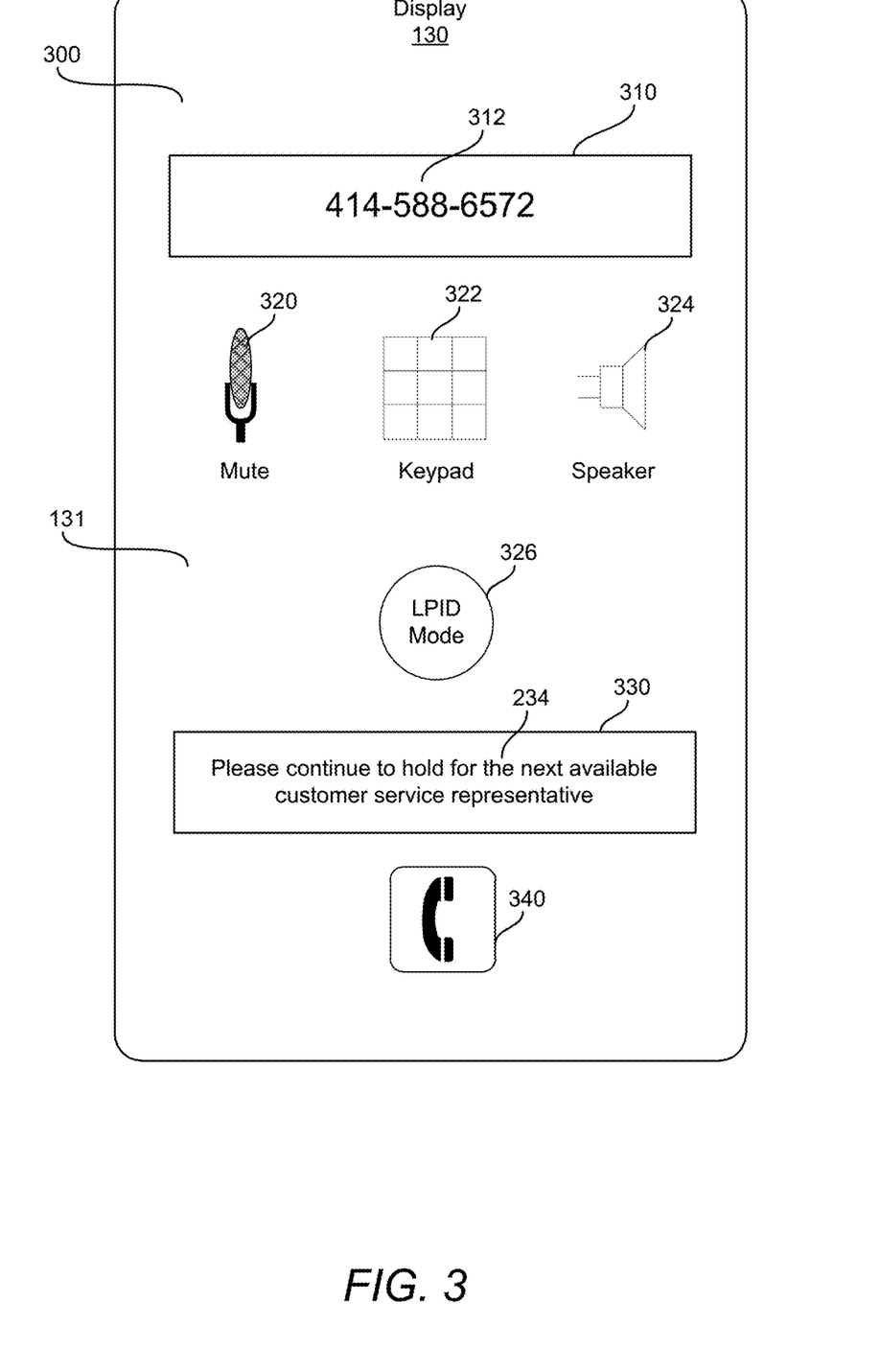
FIG. 3 is an example illustration of an in-call graphical user interface (GUI) on a display of a communication device, according to one or more embodiments.

FIG. 3 illustrates an example in-call graphical user interface (GUI) 300 presented on display 130 of communication device 100 that can be viewed by a user. GUI 300 includes an area 310 that displays the phone number 312 associated with the current phone call. GUI 300 further includes mute icon 320, keypad icon 322 and speaker icon 324. When selected by a user, mute icon 320 mutes phone call audio data 232 and microphone 108. When selected by a user, keypad icon 322 presents or shows a keypad on display 130. When selected by a user, speaker icon 324 switches the enabled speaker from speaker 144A to speaker 144B or provides user with options for selecting between speaker 144A and speaker 144B.

GUI 300 also includes live person verification or identification (LPID) mode icon 326. LPID mode icon 326 is activated by a user who chooses to place a phone call in LPID mode. When activated by a user, LPID mode icon 326 initiates a process of verifying or identifying if a live person is on a phone call initiated or received by communication device 100. During the LPID mode, phone call audio data 232 and microphone 108 can be muted. Alternatively, during the LPID mode, communication device 100 can play user selected audio content 228. LPID icon 326 can also be used to disable the LPID mode when the LPID mode is activated. After the LPID mode icon 326 has been touched or activated by a user, communication device 100 performs a series of steps or processes to identify if a live person is on the phone call at the other communication device. During LPID mode, if communication device 100 verifies or identifies a live person on the phone call at the other device, the user of communication device 100 is alerted, via a vibration, text or audio alert, that a live person is on the phone call. After being alerted that a live person is on the call, the user can automatically be connected to the other party on the call.

GUI 300 also includes an area 330 that displays phone call text data 234. Phone call text data 234 is text that has been converted from phone call audio data 232 to phone call text data 234 using speech to text algorithm 214. Display 130 further includes connect icon 340 that allows a user to resume a phone call that was previously placed in RPID mode.

In an embodiment, processor 102, executing identification module 136, can receive activation from a user, via user selection of LPID icon 326, of a verification mode for a phone call 194 and receiving, from second communication device 192 on the phone call, phone call audio data 232 associated with the phone call. Processor 102 determines if the phone call audio data 232 contains machine originated audio such as recorded audio, synthetic speech, or computer generated sounds. In response to determining that the phone call audio data 232 does not contain machine originated audio, processor 102 generates and outputs an alert that the phone call is live or that a live person is on the phone call.

Figure 4A:
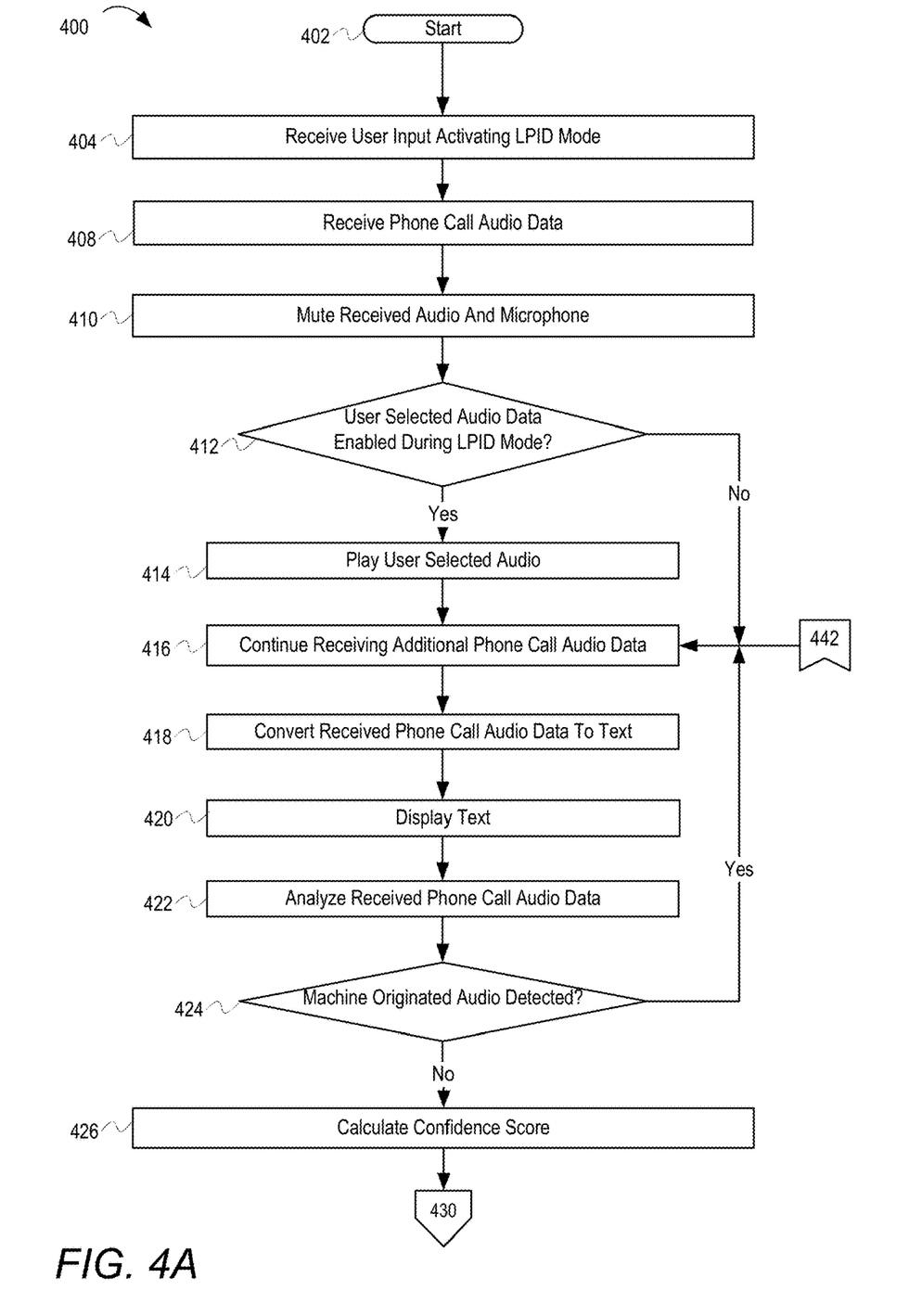
FIGS. 4A-B depicts a method of identifying a real person on a phone call, according to one or more embodiments.
Figure 4B:
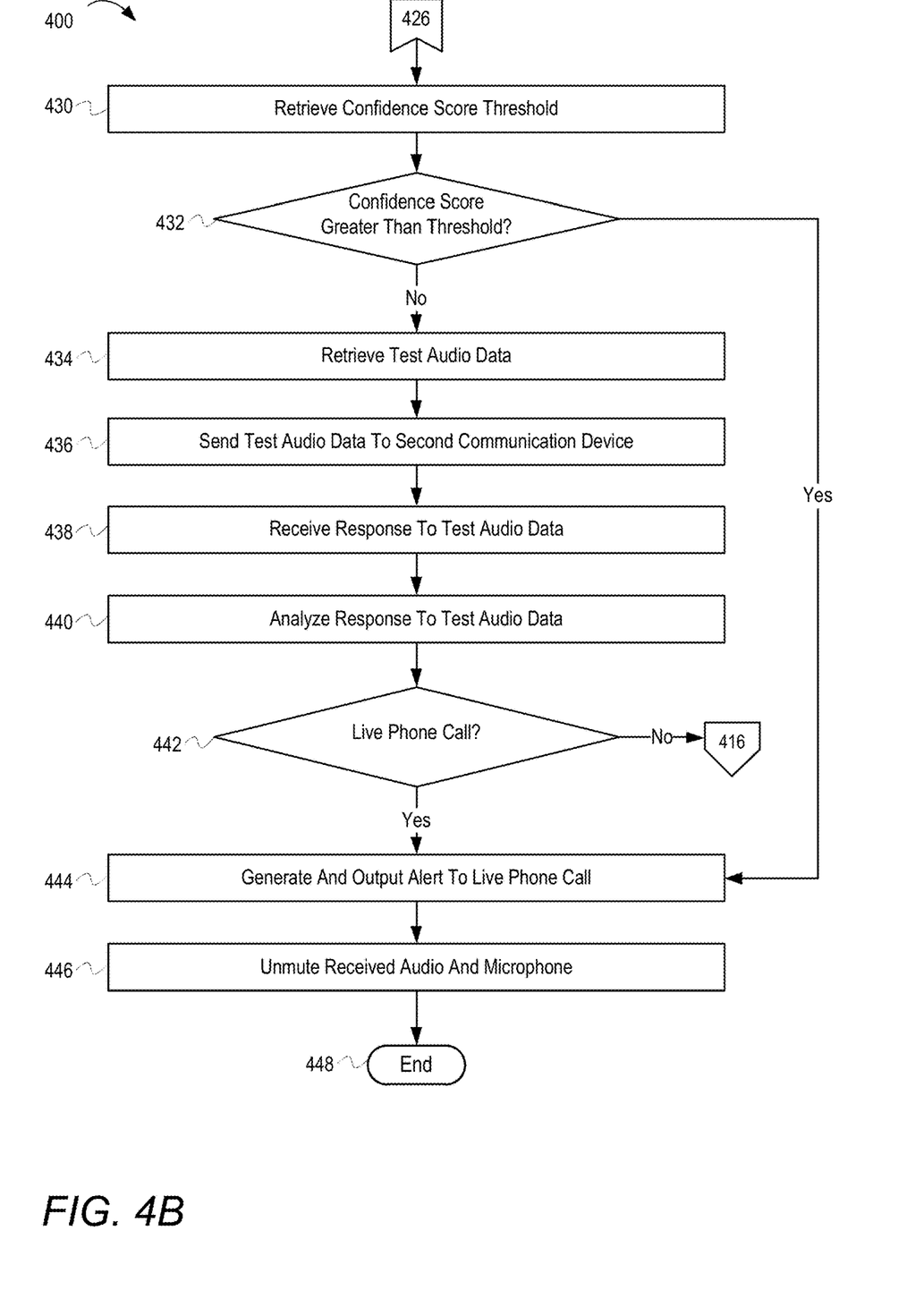

FIGS. 4A-4B depicts a method 400 for identifying a live person on a phone call or identifying if a phone call is live (i.e., with a live person), according to one or more embodiments. The description of method 400 will be described with reference to the components and examples of FIGS. 1A-3. The operations depicted in FIGS. 4A-4B can be performed by communication device 100 or 170 or any suitable device, including one or more functional components of communication device 100 that provide the described features. For example, one or more of the processes of the methods described in FIGS. 4A-B may be performed by a processor (e.g., processor 102) executing program code associated with identification module 136 using a display to present an in-call GUI, such as in-call GUI 300.

With specific reference to FIG. 4A, method 400 begins at the start block 402. Referencing communication devices 100 of FIG. 1A, phone call 194 is enabled via wireless network 150, antennas 148a-n and radios 142a-n. Phone call 194 can be initiated by the user of communication device 100 (outgoing call) or can be received from an external party (incoming call). At block 404, processor 102 receives an activation or user input from a user of communication device 100 to enable a LPID mode for phone call 194 that is in progress or being initiated/received (block 406). In one embodiment, a user can elect to place the phone call in LPID mode using LPID mode icon 326.

Processor 102 receives incoming phone call audio data 232 from second communication device 192 (block 408). Processor 102 mutes the audio associated with the phone call and mutes microphone 108 (block 410).

At decision block 412, processor 102 determines if an option to play a user selected audio has been enabled during the LPID mode. In response to determining that the option to play user selected audio has been enabled during the LPID mode, processor 102 plays the user selected audio content 228 via at least one of speakers 144A or 144B (block 414). In response to determining that the option to play a user selected audio has not been enabled during the LPID mode, processor 102 continues to receive additional phone call audio data 232 associated with phone call (block 416). Processor 102 converts the received phone call audio data 232 to phone call text data 234 (block 418) and displays the phone call text data 234 on display 130 (block 420). Processor 102 can convert the phone call audio data 232 to phone call text data 234 at least partially using speech to text algorithm 214.

Processor 102 analyzes the phone call audio data 232 (block 422). Processor 102 can analyze the phone call audio data 232 at least partially using live human voice identification algorithm 210 to ascertain if the phone call audio data 232 contains machine originated audio such as recorded audio, synthetic speech or computer generated sounds. Machine originated audio originates from a machine or device and is not live audio or speech. At decision block 424, processor 102 determines if the phone call audio data 232 contains machine originated audio from second communication device 192.

In response to determining that the phone call audio data 232 contains machine originated audio, processor 102 continues to receive additional phone call audio data 232 associated with the phone call (block 416). In response to determining that the phone call audio data 232 does not contain machine originated audio, processor 102 calculates confidence score 240 (block 426). Method 400 continues with FIG. 4B.

With reference to FIG. 4B, processor 102 retrieves confidence score threshold 242 from system memory 120 (block 430). At decision block 432, processor 102 determines if the confidence score 240 is greater than confidence score threshold 242. In response to determining that the confidence score 240 is greater than confidence score threshold 242, processor 102 generates and outputs an alert that the phone call is live (block 444) and unmutes the received audio data and the microphone (block 446). Alerting the user that a live person is on the phone call can include one or more of an audio alert via speakers 144A or 144B, generating a vibration via vibration device 160, presenting text notification on the display, and/or replaying the last portion of the incoming received audio data via speakers 144A or 144B. Method 400 then ends.

If the confidence score 240 is not greater than confidence score threshold 242, a secondary verification or identification process can be employed. In response to determining that the confidence score 240 is not greater than confidence score threshold 242, processor 102 retrieves test audio data 250 from system memory 120 (block 434). Processor 102 plays or sends test audio data 250 to second communication device 192 (block 436) and monitors the phone call to receive a response to test audio data 252 from second communication device 192 (block 438). Processor 102 analyzes the response to test audio data 252 (block 440) using response detection algorithm 212. In one embodiment, test audio data 250 is a short-delay echo of the incoming received phone call audio data 232 that is sent back to second communication device 192. Processor 102 can capture a portion of the received phone call audio data 232 (for example 5 seconds), repackage the portion and transmit the captured portion to communication device 192. The response to test audio data 252 can be an interrupt or pause in the incoming phone call audio data 232 for longer than a pre-determined time period. In an example embodiment, the pre-determined time period could be a pause of longer than 0.5 seconds in response to the test audio data. A live person hearing test audio data that is a short-delay echo of their own speech would typically be surprised to hear their own speech played back and would be expected to pause or interrupt their speech as they attempt to understand what is occurring.

At decision block 442, processor 102 determines if the phone call is live based on the received response to test audio data 252. Processor 102 determines if the phone call is live using response detection algorithm 212. Response detection algorithm 212 is configured to identify if there is a response indicating live speech is present on the phone call in response to the sent or played test audio data. For example, when test audio data is sent or played to a live person on the phone call, the expected response is for the live person to pause their speech, for a short period of time, in order to listen to the test audio data. If the party on the call is not a live person (i.e., the received audio is machine originated audio such as recorded audio, synthetic speech, or computer-generated sounds), the received audio data, such as a recorded message, would continue without interruption.

In response to determining that the phone call is not live, processor 102 continues to receive additional phone call audio data 232 associated with phone call 194 (block 416). In response to determining that the phone call is live, processor 102 generates and outputs an alert that the phone call is live (block 444), via a vibration, text or audio signal and unmutes the received audio and microphone (block 446). In an alternative embodiment, processor 102 can wait for the user to provide input to unmute the received audio and microphone. Method 400 then ends.

In the above-described method of FIGS. 4A-B, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A method comprising:
   receiving, at a first communication device, an activation of a verification mode for a phone call;
   receiving, from a second communication device on the phone call, first audio data associated with the phone call;
   in response to receiving activation of the verification mode for the phone call, muting the first audio data during the verification mode of the phone call;
   determining, via a processor of the first communication device, whether the first audio data contains machine originated audio or characteristics indicating the phone call is live; and
   in response to determining that the first audio data contains characteristics indicating that the phone call is live: generating and outputting an alert that the phone call is live; and after generating and outputting the alert, unmuting the first audio data.

2. The method of claim 1, further comprising:
   prior to generating and outputting the alert indicating that the phone call is live:
      calculating, based on characteristics of the first audio data, a confidence score that identifies whether the phone call is live, indicating that a person is present on the second communication device;
      determining if the confidence score is greater than a confidence score threshold; and
      in response to determining that the confidence score is greater than the confidence score threshold, triggering the generating and outputting of the alert.

3. The method of claim 2, further comprising:
   in response to determining that the confidence score is not greater than the confidence score threshold, sending test audio data to the second communication device;
   in response to receiving a response to the test audio data from the second communication device:
      analyzing the response to the test audio data to determine if the phone call is live and
      in response to determining, based on analyzing the response, that the phone call is live, triggering the generating and outputting of the alert.

4. The method of claim 3, wherein:
   the test audio data is a short-delay echo of the first audio data received with the phone call, where the test audio data is a captured portion of the received audio data that is repackaged and retransmitted back to a source of the received audio data; and
   the response to the test audio data comprises a pause in subsequent received audio data originating from the second communication device.

5. The method of claim 1, further comprising:
   determining if playing a pre-selected audio content has been enabled during the verification mode; and
   in response to determining that playing the pre-selected audio content has been enabled during the verification mode, playing the pre-selected audio content.

6. The method of claim 1, wherein receiving of the activation of the verification mode comprises:
   displaying a live person verification or identification (LPID) icon on a graphical user interface of the communication device;
   receiving the activation of the LPID icon by a user of the communication device; and muting the microphone and an output of the received phone call audio data during subsequent operation of the verification mode.

7. The method of claim 1, further comprising in response to muting the first audio data:
   converting phone call audio data into phone call text data; and
   displaying the phone call text data on a display of the first communication device to show what another party of the phone call is saying during a live person verification mode.

8. A communication device comprising:
   a memory having stored thereon a communication module for enabling phone calls and an identification module for identifying if a phone call is live;
   a display;
   a speaker and a microphone;
   at least one radio; and
   one or more processors communicatively coupled to the memory, the display, the speaker, the microphone and the at least one radio, the one or more processors executing program code of the communication module and the identification module, which enables the communication device to:
      receive an activation of a verification mode for a phone call;
      receive, from an external communication device on the phone call, first audio data associated with the phone call;
      in response to receiving activation of the verification mode for the phone call, mute the first audio data;
      determine whether the first audio data contains machine originated audio or characteristics indicating the phone call is live; and
      in response to determining that the first audio data contains characteristics indicating that the phone call is live: generate and output an alert that the phone call is live; and after generating and outputting the alert, unmute the first audio data.

9. The communication device of claim 8, wherein the processor is further enabled to:
   prior to generating and outputting the alert indicating that the phone call is live:
      calculate, based on characteristics of the first audio data, a confidence score that identifies whether the phone call is live, indicating that a person is present on the external communication device;
      determine if the confidence score is greater than a confidence score threshold; and
      in response to determining that the confidence score is greater than the confidence score threshold, trigger the generating and outputting of the alert.

10. The communication device of claim 9, wherein the processor is further enabled to:
   in response to determining that the confidence score is not greater than the confidence score threshold, send test audio data to the external communication device;

in response to receiving a response to the test audio data from the external communication device:
  analyze the response to the test audio data to determine if the phone call is live; and
  in response to determining, based on analyzing the response, that the phone call is live, trigger the generating and outputting of the alert.

11. The communication device of claim 10, wherein:
the test audio data is a short-delay echo of the first audio data received with the phone call, where the test audio data is a captured portion of the received audio data that is repackaged and retransmitted back to a source of the received audio data; and
the response to the test audio data comprises a pause in subsequent received audio data originating from the external communication device.

12. The communication device of claim 8, wherein the processor is further enabled to:
determine if playing a pre-selected audio content has been enabled during the verification mode; and
in response to determining that playing the pre-selected audio content has been enabled during the verification mode, play the pre-selected audio content, the pre-selected audio content being sent to another party on the phone call.

13. The communication device of claim 8, wherein to receive the activation of the verification mode the processor is further enabled to:
display a live person verification or identification (LPID) icon on a graphical user interface of the communication device;
receive the activation of the LPID icon by a user of the communication device; and
mute the microphone and an output of the received phone call audio data following during subsequent operation of the verification mode.

14. The communication device of claim 8, wherein the processor is further enabled to, in response to muting the first audio data:
convert phone call audio data into phone call text data; and
display the phone call text data on a display of the first communication device to show what another party of the phone call is saying during a live person verification mode.

15. A computer program product comprising:
a computer readable storage device with program code stored thereon which, when executed by one or more processors of a first communication device having a display, a speaker, a microphone, at least one radio and a memory, enables the communication device to complete the functionality of:
receiving, at the first communication device, an activation of a verification mode for a phone call;
receiving, from a second communication device on the phone call, first audio data associated with the phone call;
in response to receiving activation of the verification mode for the phone call, muting the first audio data;
determining whether the first audio data contains machine originated audio or characteristics indicating the phone call is live; and
in response to determining that the first audio data contains characteristics indicating that the phone call is live: generating and outputting an alert that the phone call is live; and after generating and outputting the alert, unmuting the first audio data.

16. The computer program product of claim 15, wherein the program code for identifying if a phone call is live comprises program code that further enables the first communication device to complete the functionality of:
prior to generating and outputting the alert indicating that the phone call is live:
  calculating, based on characteristics of the first audio data, a confidence score that identifies whether the phone call is live, indicating that a person is present on the second communication device;
  determining if the confidence score is greater than a confidence score threshold; and
in response to determining that the confidence score is greater than the confidence score threshold, triggering the generating and outputting of the alert.

17. The computer program product of claim 16, wherein the program code for identifying if a phone call is live comprises program code that further enables the first communication device to complete the functionality of:
in response to determining that the confidence score is not greater than the confidence score threshold, sending test audio data to the second communication device;
in response to receiving a response to the test audio data from the second communication device:
  analyzing the response to the test audio data to determine if the phone call is live and
  in response to determining, based on analyzing the response, that the phone call is live, triggering the generating and outputting of the alert.

18. The computer program product of claim 17, wherein:
the test audio data is a short-delay echo of the first audio data received with the phone call, where the test audio data is a captured portion of the received audio data that is repackaged and retransmitted back to a source of the received audio data; and
the response to the test audio data comprises a pause in subsequent received audio data originating from the second communication device.

19. The computer program product of claim 15, wherein the program code for receiving of the activation of the verification mode comprises program code for:
displaying a live person verification or identification (LPID) icon on a graphical user interface of the communication device;
receiving the activation of the LPID icon by a user of the communication device; and
muting the microphone and an output of the received phone call audio data during subsequent operation of the verification mode.

20. The computer program product of claim 15, further comprising program code for, in response to muting the first audio data:
converting phone call audio data into phone call text data; and
displaying the phone call text data on a display of the first communication device to show what another party of the phone call is saying during a live person verification mode.

* * * * *